US005628014A

United States Patent [19]
Cecchini et al.

[11] Patent Number: 5,628,014
[45] Date of Patent: May 6, 1997

[54] METHODS AND APPARATUS FOR NODE CACHING AT THE FILE LEVEL

[75] Inventors: Albert B. P. Cecchini, Jamestown, N.Y.; David Kessler, Lexington, Mass.

[73] Assignee: ParaNode, Inc., Jamestown, N.Y.

[21] Appl. No.: 383,665

[22] Filed: Feb. 3, 1995

Related U.S. Application Data

[63] Continuation of Ser. No. 853,975, Mar. 20, 1992, abandoned.

[51] Int. Cl.$^6$ .................................................. G06F 12/02
[52] U.S. Cl. .................................................. 395/621
[58] Field of Search .............................. 395/600, 650, 395/700

[56] References Cited

U.S. PATENT DOCUMENTS

| | | | |
|---|---|---|---|
| 4,476,526 | 10/1984 | Dodd | 395/425 |
| 4,780,821 | 10/1988 | Crossley | 395/650 |
| 4,891,752 | 1/1990 | Fairman et al. | 395/425 |
| 5,012,407 | 4/1991 | Finn | 395/700 |
| 5,121,492 | 6/1992 | Saville et al. | 395/500 |
| 5,123,092 | 6/1992 | Buxton et al. | 395/250 |
| 5,123,098 | 6/1992 | Gunning et al. | 395/400 |
| 5,140,592 | 8/1992 | Idleman et al. | 371/8.1 |
| 5,150,465 | 9/1992 | Bush et al. | 395/275 |
| 5,218,691 | 6/1993 | Tuma et al. | 395/500 |
| 5,239,643 | 8/1993 | Blount et al. | 395/425 |
| 5,261,072 | 11/1993 | Siegel | 395/425 |
| 5,265,252 | 11/1993 | Ranson et al. | 395/700 |
| 5,359,725 | 10/1994 | Garcia et al. | 395/500 |
| 5,371,885 | 12/1994 | Letwin | 395/600 |
| 5,430,845 | 7/1995 | Rimmer et al. | 395/700 |
| 5,438,674 | 8/1995 | Keele et al. | 395/500 |
| 5,499,378 | 3/1996 | McNeil et al. | 395/500 |

OTHER PUBLICATIONS

McCuster, "Now Playing: Compact disks on LAN", Oct. 15, 1990, See the full text Abstract.
Rosenberg, Dictionary of Computers, Information Processing and Telecommunications 2nd Ed., 1987, p. 448.

*Primary Examiner*—Kevin A. Kriess
*Assistant Examiner*—John O. Chavis
*Attorney, Agent, or Firm*—Woodcock Washburn Kurtz Mackiewicz & Norris

[57] ABSTRACT

Methods and apparatus for caching files in DOS based computer systems are disclosed wherein the computer systems include a nonstandard drive in which files have been stored and from which files can be accessed, retrieved or written to, a computer CPU for generating instructions for accessing, retrieving or writing portions of desired files, wherein said instructions for accessing, retrieving or writing are generated through the use of DOS interrupt 21 and a drive, recognized by the computer CPU as a DOS drive, for storage and access, retrieval or writing of files, wherein the access, retrieval or writing of files from the drive can be achieved faster than access, retrieval or writing of files from the non-standard drive. A file handler monitors CPU generated instructions directed through DOS interrupt 21 and in response to instructions for accessing, retrieving or writing portions of the files, the file handler retrieves information contained in files from the non-standard drive and caches the information in the drive. The disclosed computer system can also include a plurality of non-standard and standard drives to which the file handler is attached. In such an embodiment, the file handler is either preset as to which of the non-standard drives should be cached or not, or the file handler includes code for selecting or not the nonstandard drives to be cached. Such selective caching can be extended to particular files as well. In addition, methods of nonstandard drive selection can be extended to include a plurality of standard drives.

19 Claims, 11 Drawing Sheets

METHODS AND APPARATUS FOR NODE CACHING AT THE FILE LEVEL

This is a continuation, of application Ser. No. 853,975, filed Mar. 20, 1992, now abandoned.

FIELD OF INVENTION

In any system, caching has been found to be a major mechanism for increasing the performance of data accessing from storage media. This boost in performance is due to moving information from a slower medium to a faster medium and doing it in more optimum chunks than the operating system requires, so that the second time the same information is requested, it is available from a faster or closer source. Based on the hardware configuration, whether the word "configuration" is applied to network or stand alone machines, different caching schemes must be developed.

This invention relates to the DOS based operating system on IBM PC's or compatibles, and more particularly for caching drives which are not recognized by DOS as being one of the two physical drives allowed through the use of standard DOS architecture.

BACKGROUND OF THE INVENTION

As is the case with all operating systems, DOS provides the basic foundation for the initialization of computer hardware for use by higher level software. In most cases DOS acts as the interface between the higher level software and the hardware. DOS based architecture and the architecture of IBM PC's, BIOS, and the Intel 80X series of chips has created some unique conditions which limit the robustness of the hardware not realized by other CPU architectures (Mainframe, Mini, RT, Mackintosh, Etc). One limitation is the recognition of only two (2) physical hard drives and two (2) floppy drives using standard DOS architecture.

FIG. 1 is a representation of the standard DOS architecture showing the DOS based computer (1D) with representations of its internal components. As displayed, the standard DOS disk input/output interface is allowing for information exchange between the two standard hard drive storage media, Drives 1-A and 2-A. The arrows represent direct communication between 1B and the Standard Drives. Computer Random Access Memory (RAM) is depicted by item 1C.

A drawback to data exchange between 1B and standard storage media is performance. The cause of this performance hit is the length of time it takes the storage media to retrieve or write the information after it gets the request. Prior art dramatically improved performance by implementing a "cache" in RAM. Caching is implemented between the standard DOS Disk I/O Interface (1B) and the Standard Drives (#1-A & #2-A). A cache acts as a reservoir for frequently requested information from the storage media. When a request comes from the computer (1D) to 1B, the cache implementation processes the request from 1B and checks to see if it already has the information from a previous request. If it does it supplies the information from the cache. Since the cache is an area of memory, it processes the request at a substantially faster rate than if the request would have gone through the routing of FIG. 1.

FIG. 2 is a representation of the system depicted in FIG. 1 with the incorporation of a standard cache (3C). The arrows represent the routing of information requests from 1B to 3C and then from 3C to 1-A and 2-A. The prior art of caching reserves a block of RAM (1C) for the storage of all files or pieces of files requested. Drawbacks are, that there is no mechanism which distinguishes files to be cached, and the memory used as the caching area cannot be used for other purposes by different software applications.

As has been intimated throughout this discussion, implementation of caches for standard drives are made through specific routes which process the standard requests.

FIG. 3, depicts the incorporation of a prior art RAM Disk (2C) into the standard architecture of FIG. 1. A RAM disk is a program which uses a block of RAM and turns it into a device which is recognized by DOS as a disk drive. Once established the RAM disk can be accessed (at the speed of memory) for many purposes by many different software applications, since it mimics standard storage devices. It is apparent from the previous discussion that this memory is distinctly different in characteristics as well as location, from the block of memory established for caching frequently requested information.

The limitation of the DOS based architecture to information routes to only two (2) standard hard drive storage devices, produced the need to find other routes for processing requests. Among these new prior art routes are the SCSI interface and the Local area network interface in DOS.

The SCSI interface was migrated to the PC level to provide new routes for accessing multiple and different types of data storage and retrieval devices. Devices such as CDROM (Compact Disk Read Only Memory), MOD (Magnetic Optical Disks {Read/Write}), WORM (Write Once Read Many), Jute Boxes (Robotic mechanism for automatically changing disks without user intervention these can be both ROM & WORM drives), Bernoulli and tape subsystems, could be simultaneously attached to the Standard DOS Disk I/O, and appear as another drive to the system. FIG. 4 depicts this additional SCSI route and a number of Non-Standard storage devices (Drive 1E≧4E).

FIG. 4 depicts a RAM disk (2C) in addition to the standard cache routing depicted in FIG. 3. Please note the distinct routing and memory area used for standard cache implementation.

Similarly, the DOS Local Area Network interface (LAN) allows sharing hard drives of a file server in a client server LAN, or the hard drives of a neighboring computer in a DOS based pear-to-pear LAN, through another distinct route. As was the case for the DOS SCSI interface, this provide new routes for accessing multiple and different types of data storage and retrieval devices physically located in different computers.

FIG. 5 is identical to FIG. 4 except, it is illustrative of the distinct nature of the Network (LAN) route for information requests.

The additional routing methods of prior art are not exclusive in nature due to their distinct implementation, and resultant routes.

FIG. 6 depicts the incorporation of both DOS SCSI and LAN routes incorporated into a single computer (1D).

FIG. 4 through FIG. 6 inclusive, are illustrative of the prior art caching implementations use within the standard DOS drive route only. Current caching techniques to date, have been ineffectual on additional routings which have been implemented.

Caching becomes very important with regard to these additional routes, since typical information retrieval times are slower through these routes than uncached standard hard drives.

SUMMARY OF THE INVENTION

It is therefore an object of the invention to improve the response time in accessing files through routings which are not supported via the standard DOS disk input/output interface.

It is a further object of this invention to use any recognized DOS storage device as a medium for the cache, and that this area does not have to be a reserved storage area for the exclusive use of the cache.

It is a further object of this invention to establish a means where by the computer operator may select which files are to be cached.

It is a further object of this invention to establish a cache for these additional routings which can function in conjunction with the prior art caching implementations for standard drives.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which.

DESCRIPTION OF THE PREFERRED EMBODIMENT

A point of convergence in DOS for all file requests is at DOS INT21 (Interrupt 21). In DOS, most if not all file requests are channelled through this interrupt on their way to their designated routes. The embodiment of the present invention requires the use of this interrupt as a point for watching file requests before they are pointed to the non-standard routes.

Figure 1:
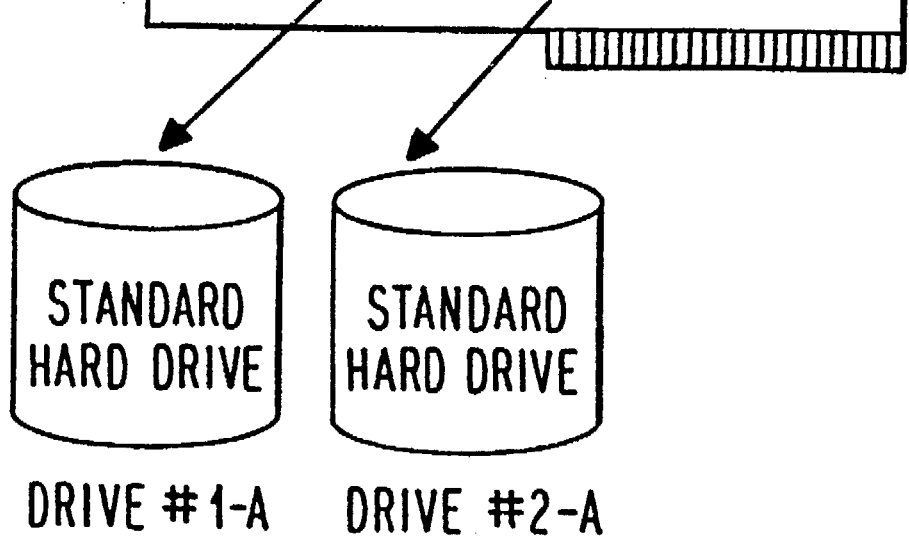
FIG. 1 is a block diagram of a prior art standard DOS architecture of a DOS based computer inclusive of a CPU.
Figure 2:
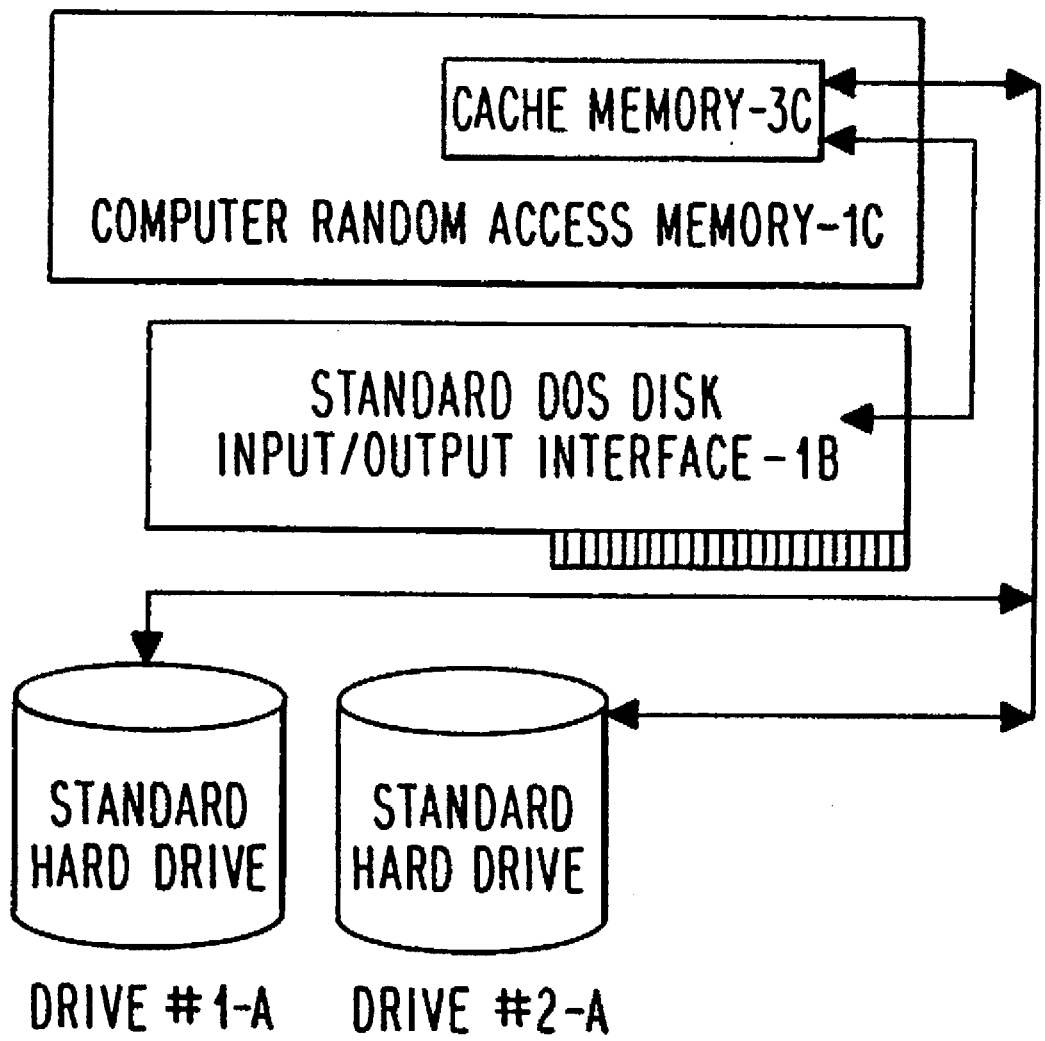
FIG. 2 is a block diagram of the prior art standard DOS architecture of the DOS based computer shown in FIG. 1, further including a standard cache.
Figure 3:
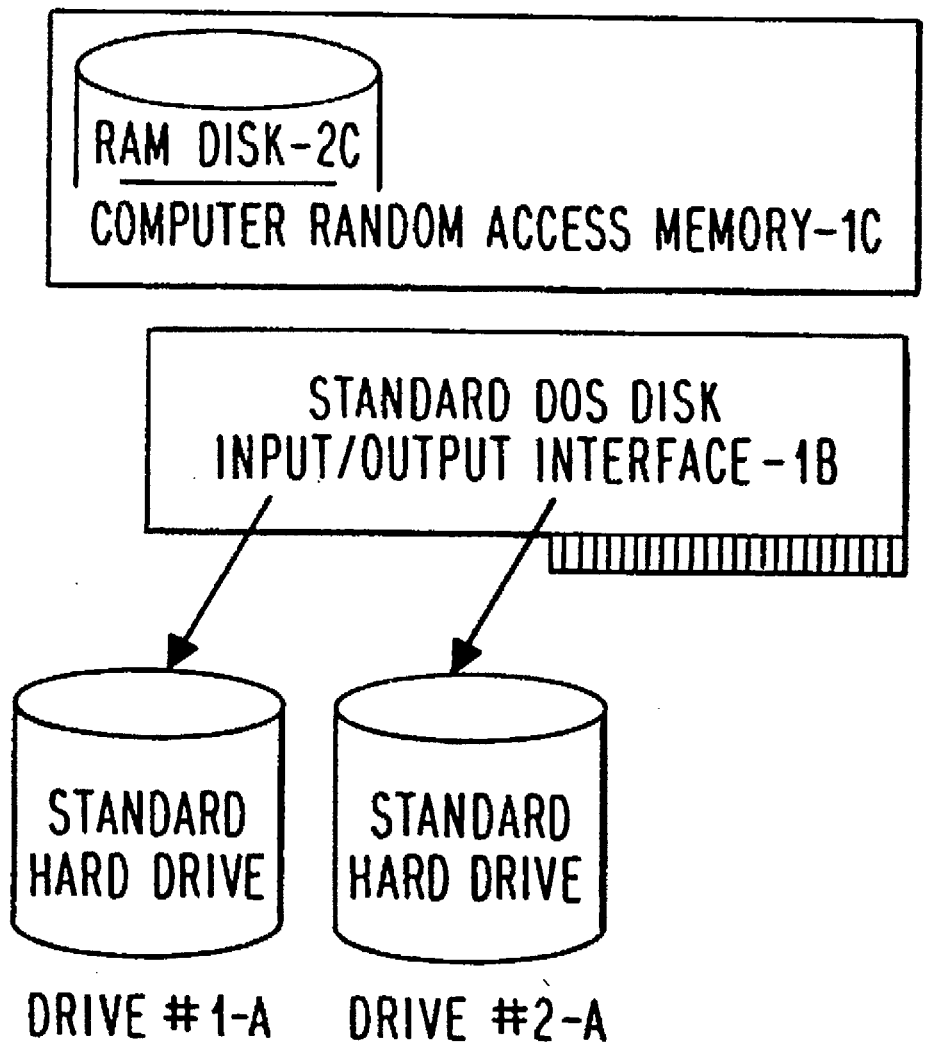
FIG. 3 is a block diagram of the prior art standard DOS architecture of the DOS based computer shown in FIG. 1, further including a RAM disk.
Figure 4:
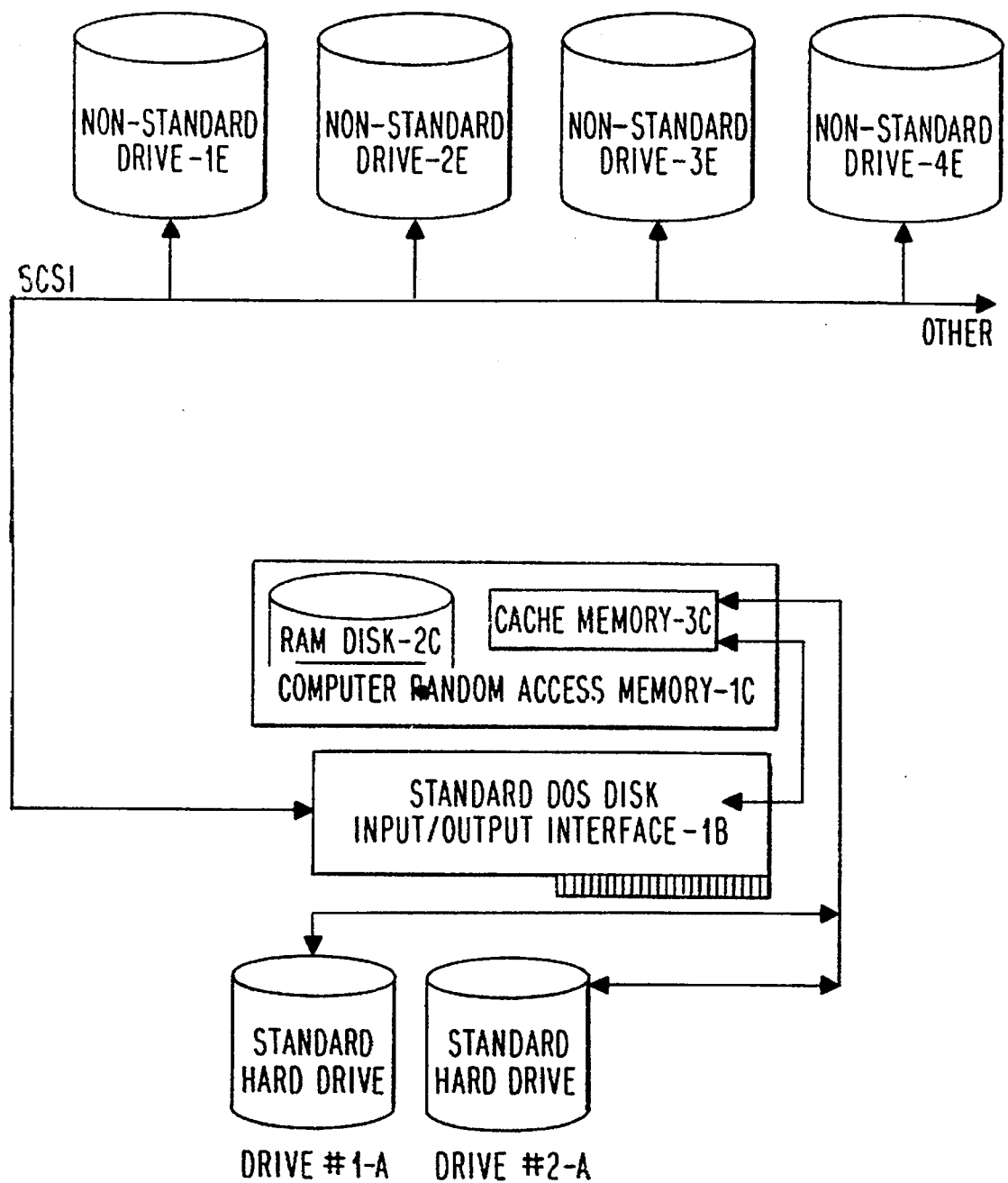
FIG. 4 is a block diagram of the prior art standard DOS architecture of a DOS based computer shown in FIG. 1, further including a number of Non-Standard storage devices, a RAM disk and a standard cache.
Figure 5:
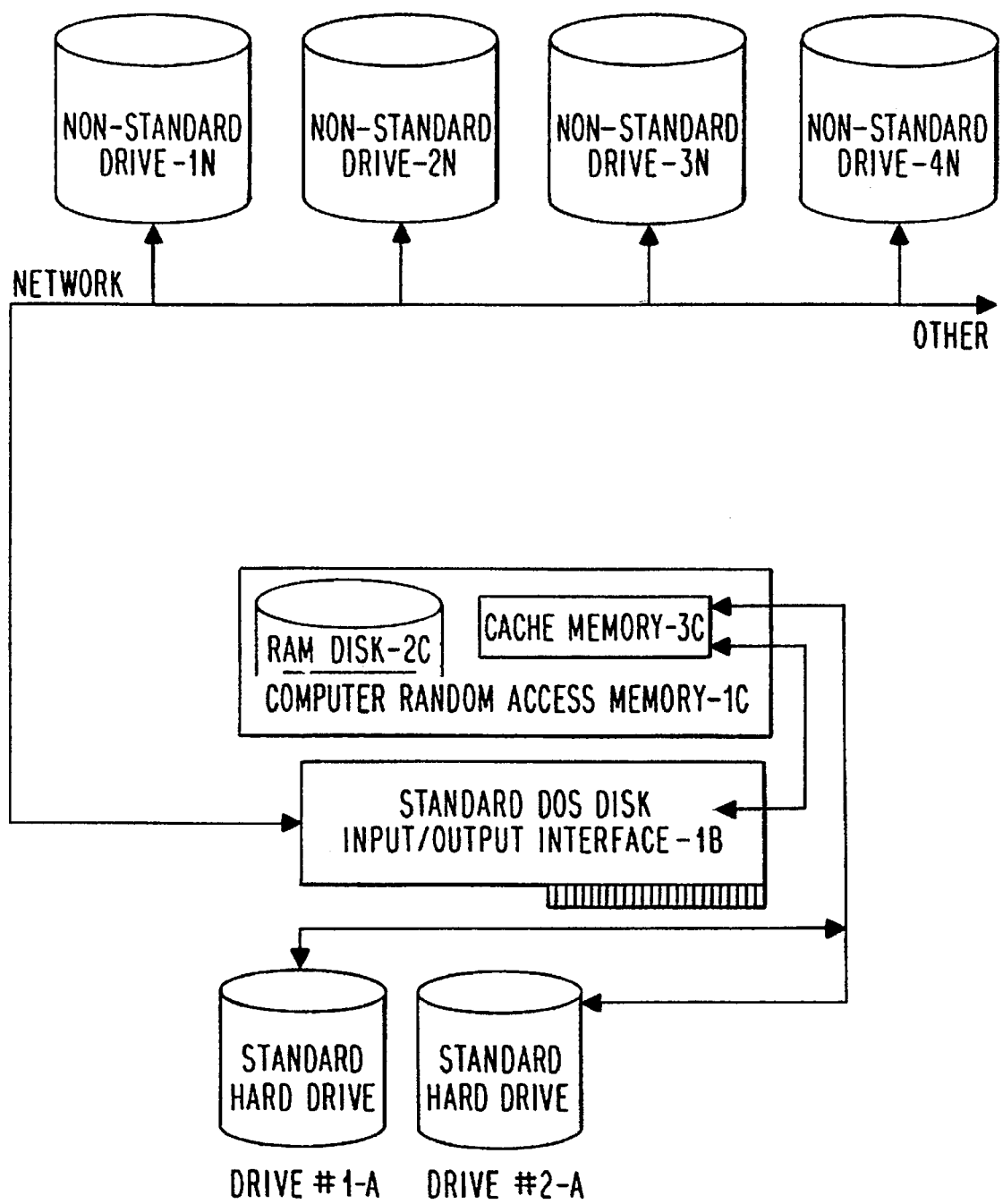
FIG. 5 is a block diagram of the prior art standard DOS architecture of a DOS based computer shown in FIG. 1, further including a number of Non-Standard storage devices in a local area network, a RAM disk and a standard cache.
Figure 6:
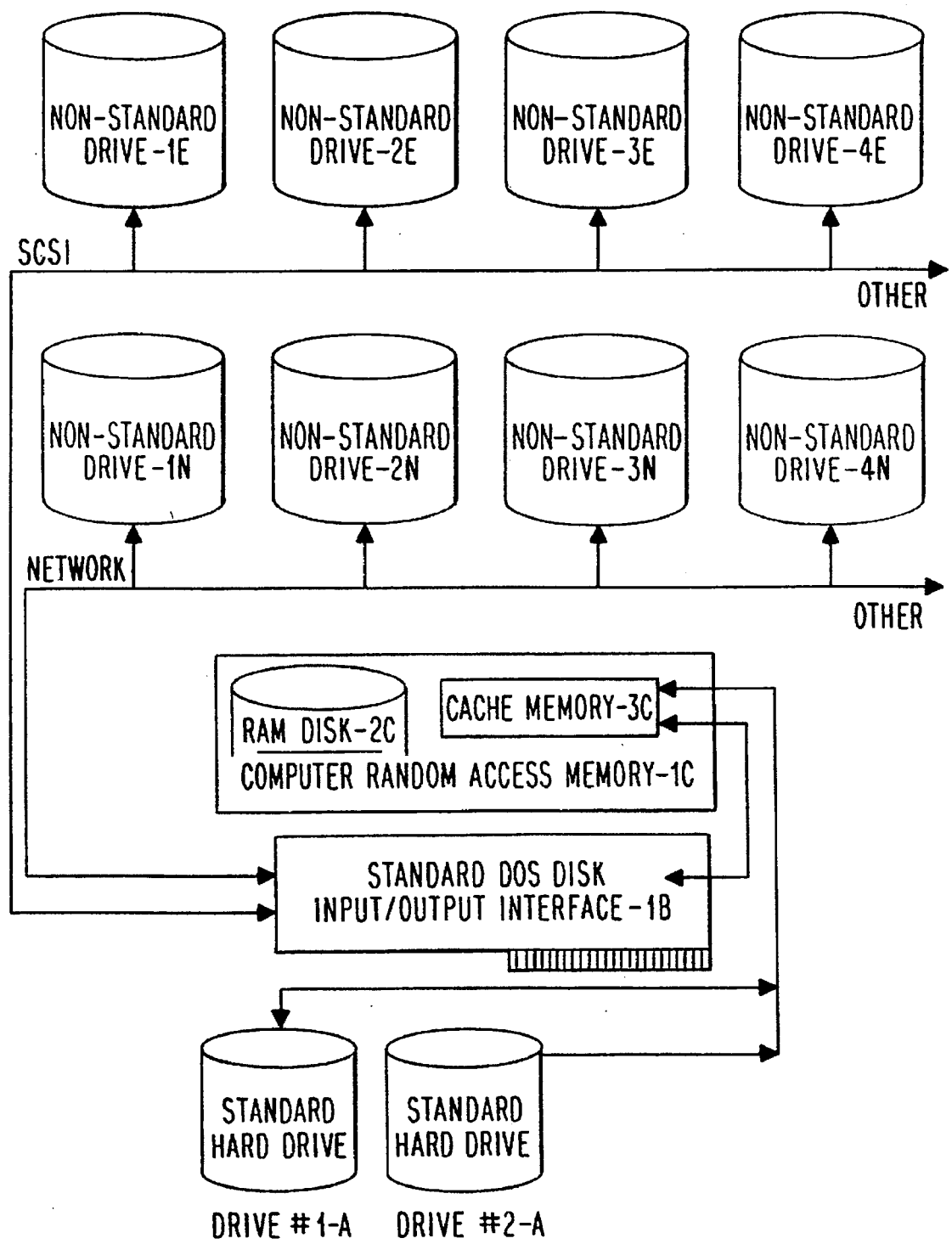
FIG. 6 is a block diagram of the prior art standard DOS architecture of a DOS based computer shown in FIG. 5, further including a number of Non-Standard storage devices with an SCSI interface.
Figure 7:
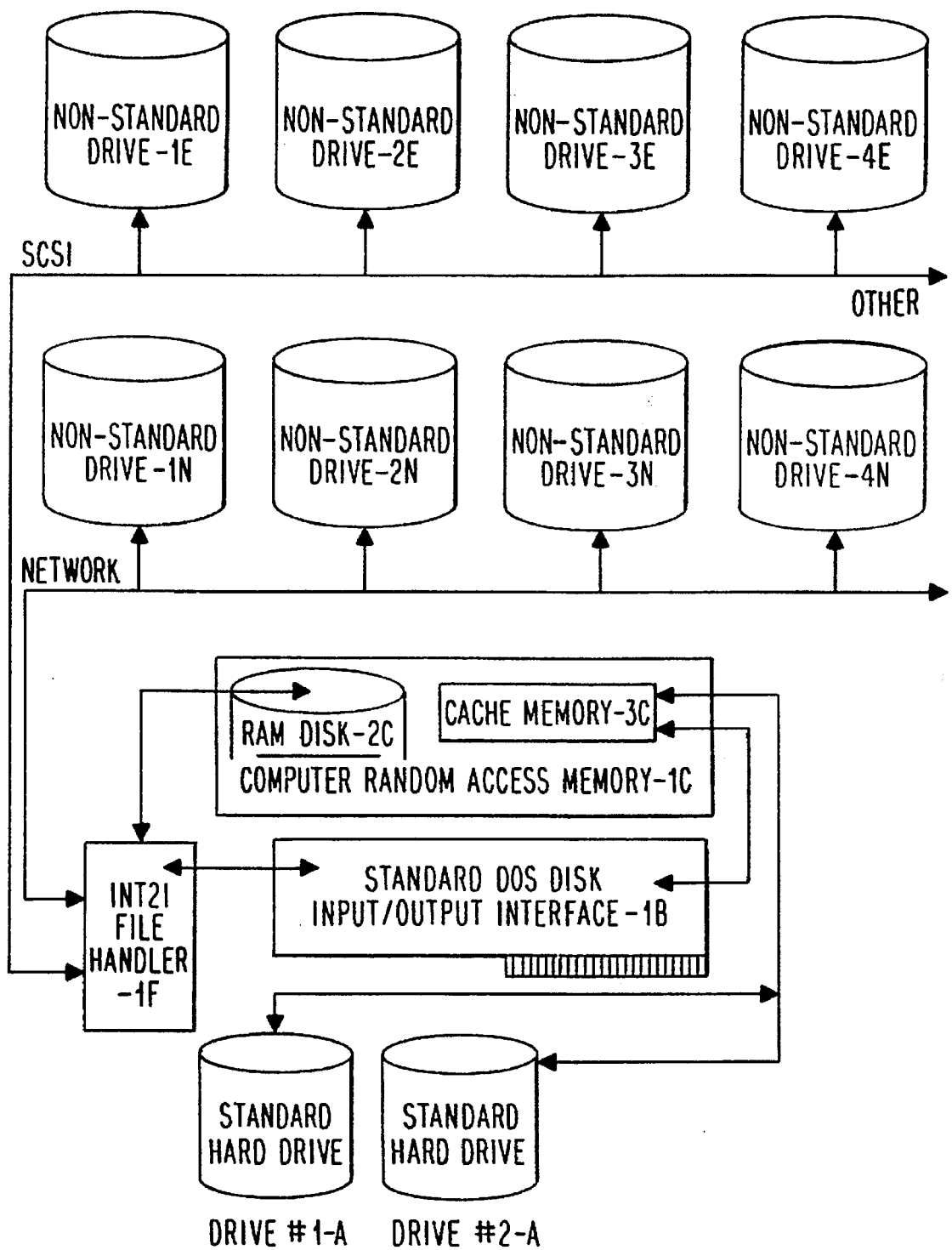
FIG. 7 is a block diagram of the DOS architecture of a DOS based computer in accordance with the present invention.

FIG. 7 depicts the system described by FIG. 6 incorporating the embodiment of the present invention, denoted as INT21 File Handler (1F). The invention is positioned between the standard DOS Disk Input/Output Interface (1B) and the non-standard routings. As indicated in the Figure, it is separate and distinct from prior art disk cache implementations.

Unlike prior art standard disk cache implementations, the medium used for caching the requested information is any recognized DOS drive. This is represented in FIG. 7 by the bi-directional arrows between the RAM Disk (2C) and the Standard Hard Drive 1-A. It is therefore unnecessary to have a reserved area of RAM for exclusive cache use, as is the case for prior art caches. An additional advantage, is the capability to cache much larger and/or many more files, since caching may be directed to drives which are far greater in size than the state-of-the-art RAM area.

As is the case for all systems defined as a "cache", as file requests are made, the invention processes the request from 1B and checks to see if it already has the information from a previous request. If it is not, it caches the file to one of the alternate storage devices. If it is cached to a RAM disk, performance is improved to a greater extent than if it were cached to a hard drive. However, size or quantity of files may be an issue. In this case faster hard drives than the source may be preferable as a storage medium. If a second request comes for the same information, the invention detects the request and automatically redirects it to the faster cache drive.

If a standard hard drive is used as the cache medium, prior art caches (3C) would operate in conjunction with the invention as it directs files to the standard drives (1-A & 2A). This results from the use of the standard DOS disk I/O route by the invention when directing the file to the invention's cache and the down stream location of the prior art cache with respect to the invention.

The present invention may be implemented as a DOS Terminate and Stay Resident (TSR) software program or a loader program "parent" which returns unused memory to do DOS and then launches "child" application(s).

This invention (embodied in software or hardware form) after it is installed, sits on DOS INT 21 (Interrupt 21) and watches as DOS processes requests for files from application programs.

The following is offered as an example of one of the potential embodiments of the invention as a read only cache. It is meant to be informative and not meant to impose restrictions upon other embodiments which may include write as well as read functions.

Processing path 1

Figure 8:
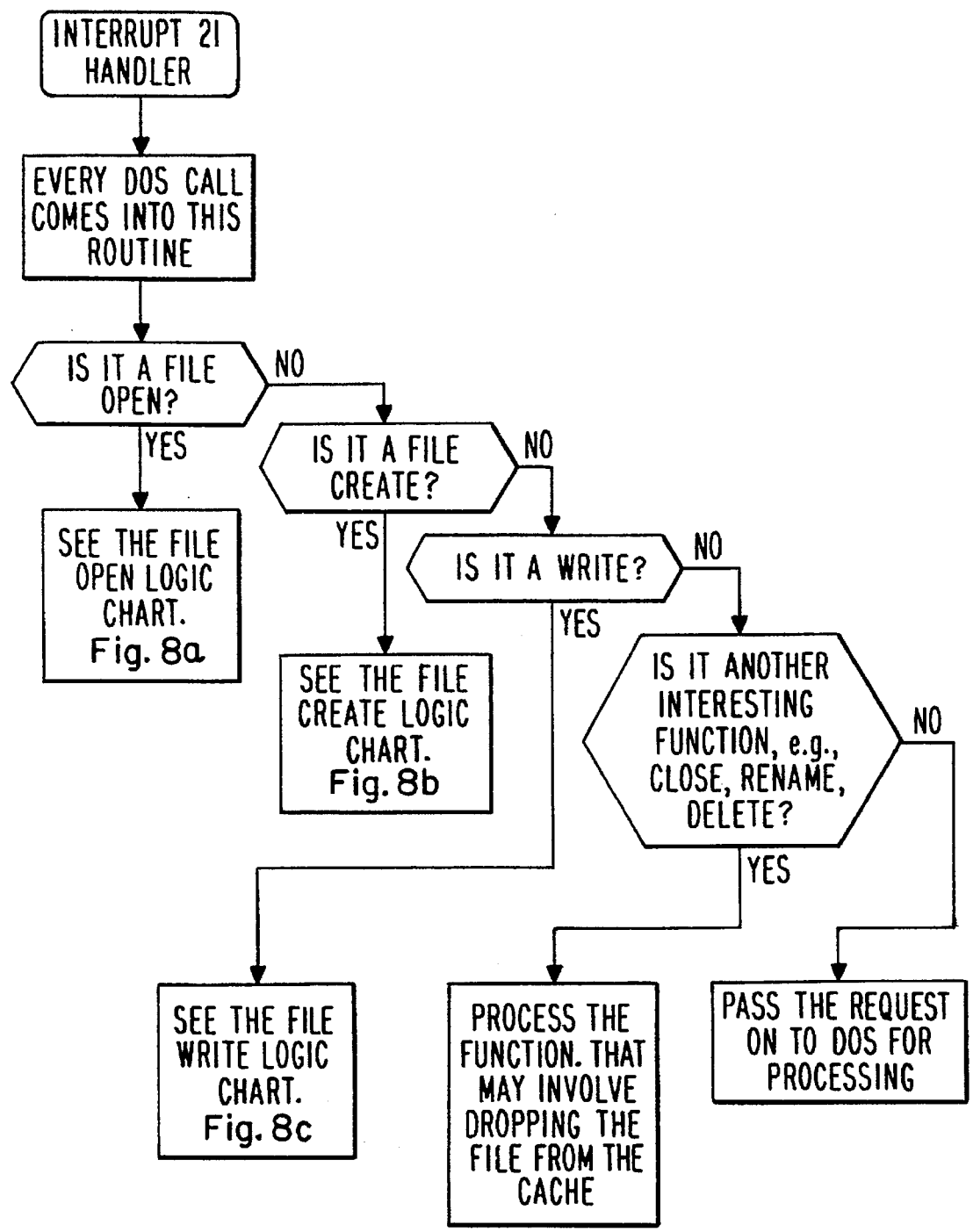
FIG. 8 is a flow chart of the operation of the File Handler depicted in FIG. 7.
Figure 8A:
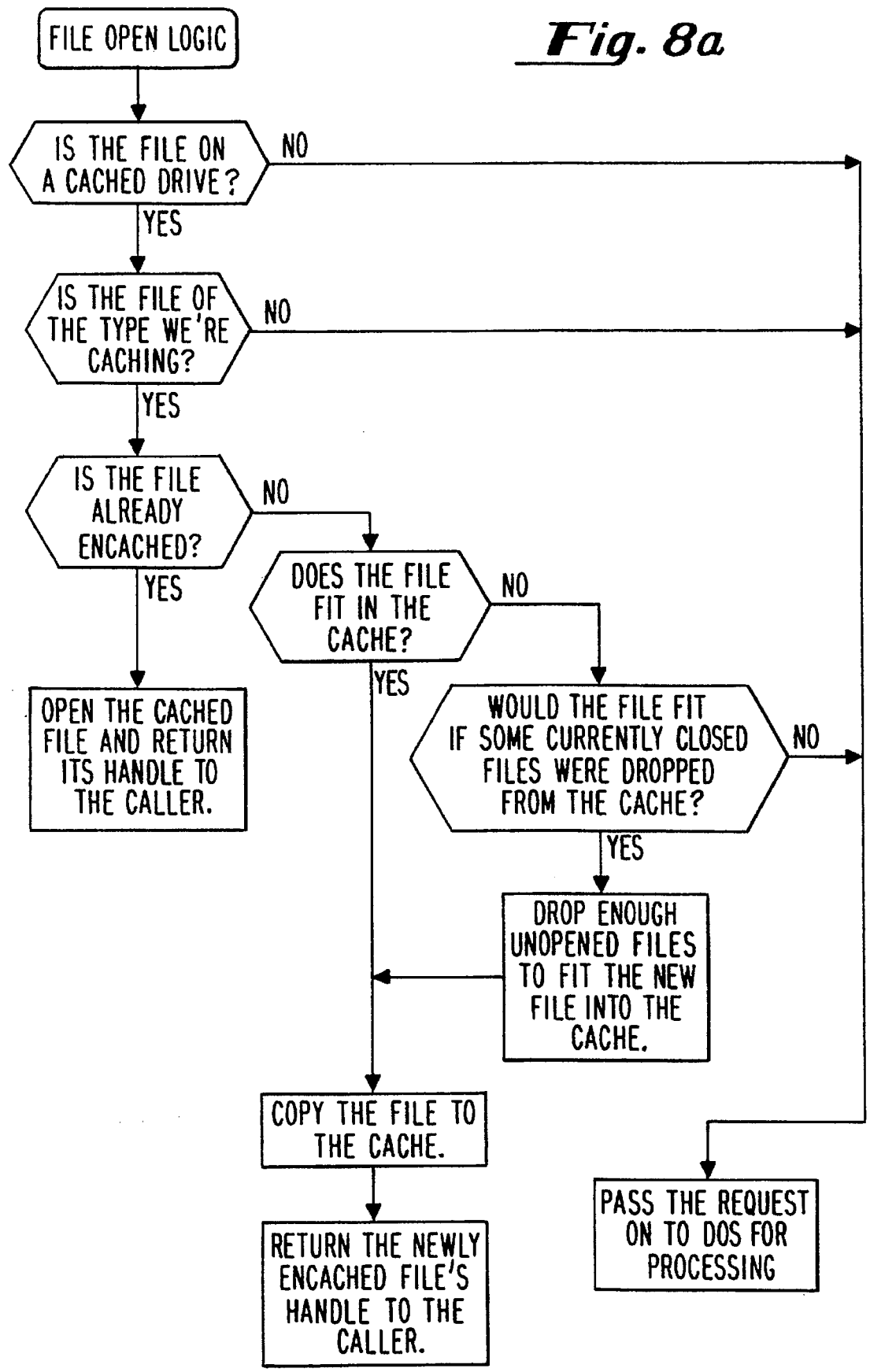
FIG. 8a is a flow chart of an alternate operation of the File Handler depicted in FIG. 7.

As the invention sees an open file request come from an application, it checks to see if the file is already open (FIG. 8). If it is open, it checks to see if it is in the cache drive (FIG. 8a). If it is not in the cache it passes the application's request to DOS. If it is in the cache, is it the type of file that the computer operator has requested to be cached? If no, it passes the application's request to DOS. If yes, is checks to see if the file is already in the cache. If it is the invention opens the file in the cache, and the application uses it from the cache. If the file is not in the cache, the invention checks to see if it will fit in the cache. If it will fit it copies it to the cache drive and opens it for use from the cache for the application. If it will not fit in the cache, the invention checks to see if enough of the closed files in the cache can be deleted from the cache to fit the newly requested file into the cache. If the newly requested file will not fit in the cache even if all of the closed files have been deleted from the cache then, pass the application's request to DOS and retain the closed files in the cache in case a request comes in for one of them. If it will fit into the cache, drop enough unopened files to fit the new file into the cache, then copy the newly requested file into the cache drive and open it for use from the cache for the application.

Processing path 2

Figure 8B:
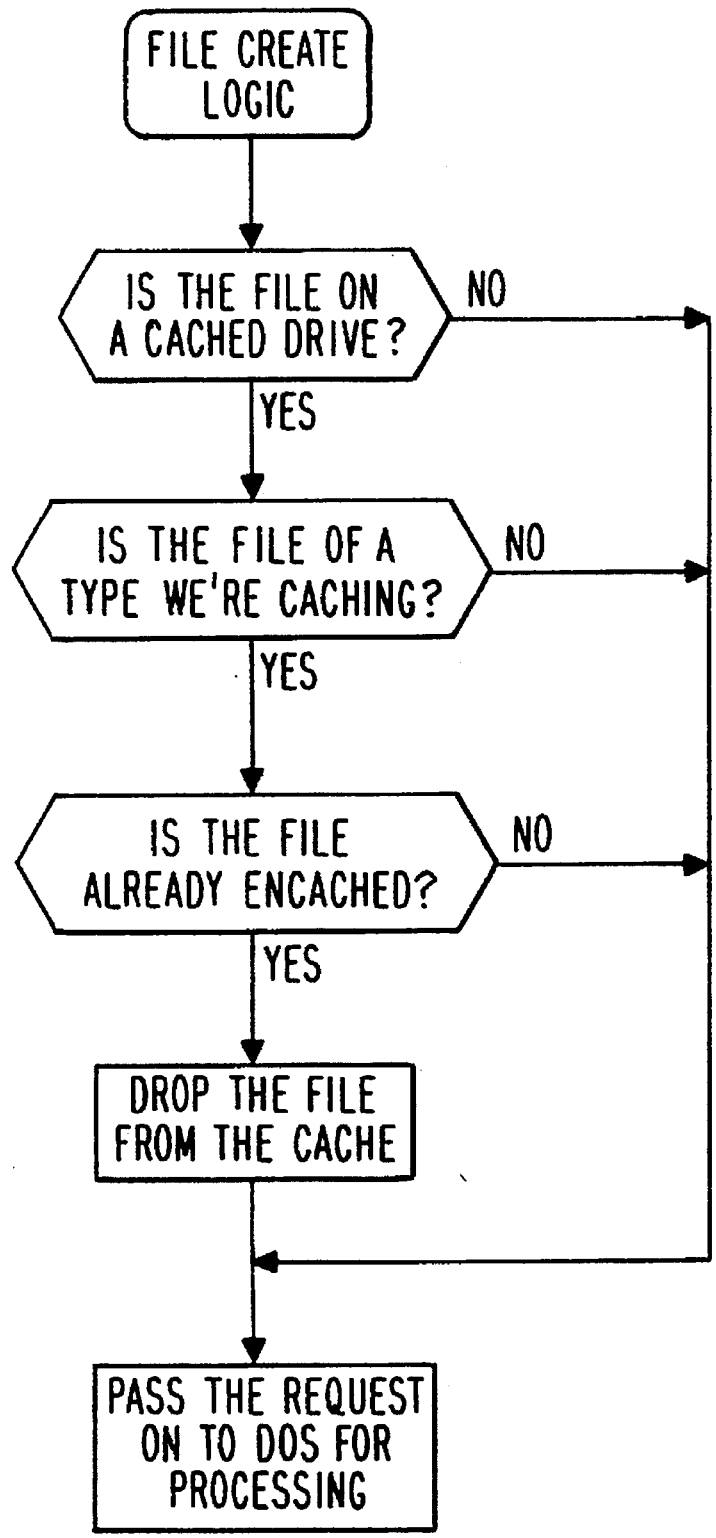
FIG. 8b is a flow chart of an alternate operation of the File Handler depicted in FIG. 7.

As the invention sees an open file request come from an application, it checks to see if the file is already open (FIG. 8). If it not open, it checks to see if it is a file which the application has requested to create. If it is a create request, the invention checks to see if the create is to produce a file on a drive being cached by the invention (FIG. 8B). If it is not, it passes the request to DOS for processing. If it is, is it the type of file that the computer operator has requested to be cached? If no, it passes the application's request to DOS. If yes, is checks to see if the file is already in the cache. If the file is not in the cache, the invention passes the application's request to DOS. If it is in the cache it drops the file from the cache and passes the application's request to DOS.

Processing path 3

Figure 8C:
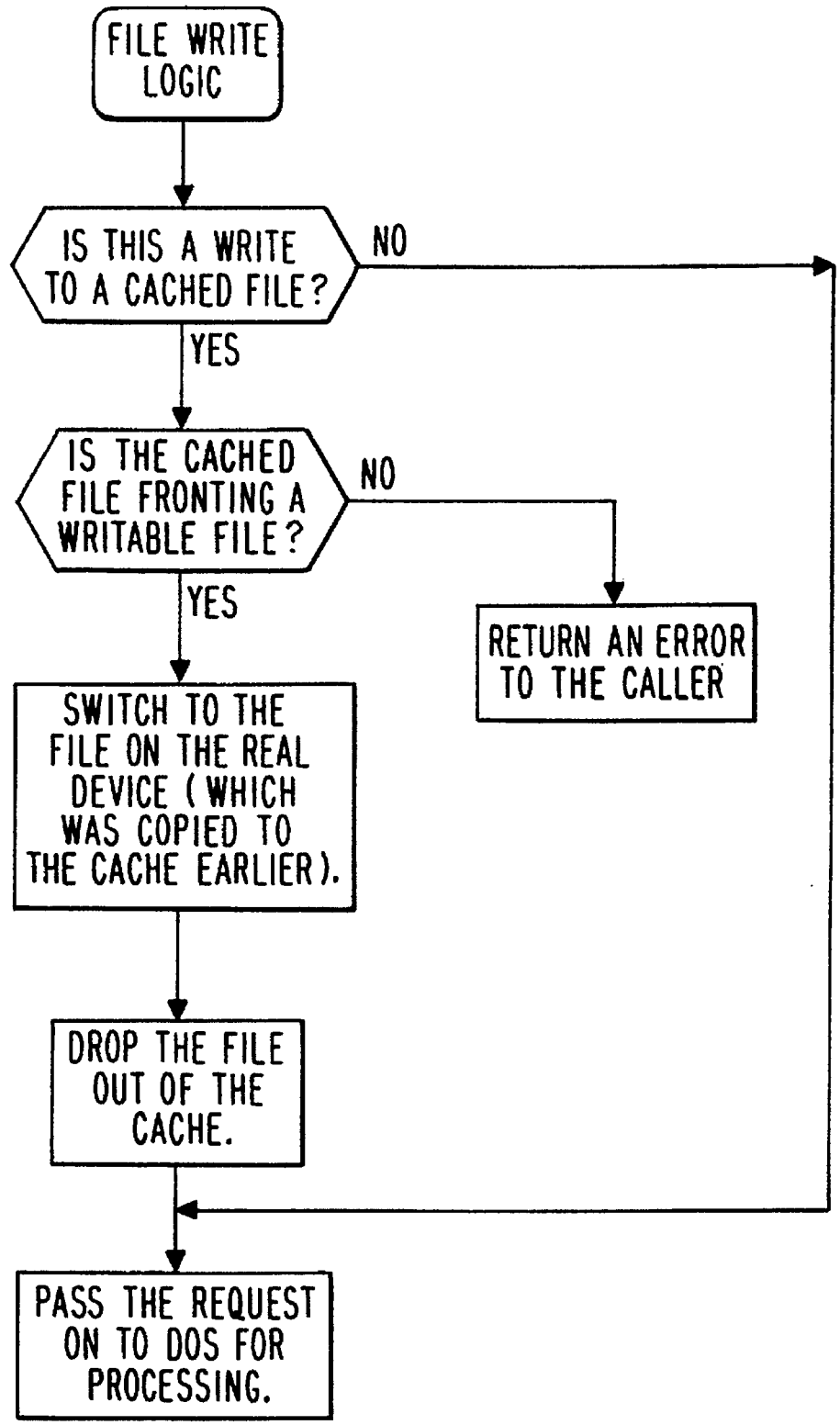
FIG. 8c is a flow chart of an alternate operation of the File Handler depicted in FIG. 7.

As the invention sees an open file request come from an application, it checks to see if the file is already open (FIG. 8). If it not open, it checks to see if it is a file which the application has requested to create. If it is not a create request, it checks to see if it is a write request. If it is a write request, is it a write to a file which has been cached (FIG. 8c). If it is not, the invention passes the application's request to DOS. If it is in the cache, the invention checks to see if the cached file is a file which can be written to. If it is not the invention returns an error to the requesting application. If it is a file which can be written to, the invention opens the file on the drive being cached and then drops the file from the cache and passes the applications write request to DOS.

Processing path 4

As the invention sees an open file request come from an application, it checks to see if the file is already open (FIG. 8). If it not open, it checks to see if it is a file which the application has requested to create. If it is not a create request, it checks to see if it is a write request. If it is not a write request, is it another interesting function (e.g. close, rename, delete?). If it is not, the invention passes the application's request to DOS. If it is, is the file in the cache? If it is not, the invention passes the application's request to DOS. If it is in the cache, the invention processes the request which may or may not result in the file being deleted from the cache medium.

What is claimed:

1. A DOS based computer system having node caching at a file level, said system comprising:
    a CPU for generating instructions, wherein said instructions include those for accessing, retrieving or writing to portions of files or entire files, wherein the instructions for accessing, retrieving or writing contain those instructions directed through DOS interrupt 21;
    a non-standard DOS drive in which desired files or nodes have been stored and from which said desired files or nodes can be accessed, retrieved or written, said desired files or nodes containing stored information;
    a standard DOS drive, recognized by said CPU as a standard DOS drive, adapted for storage of file information and access, retrieval or writing of files, wherein the access, retrieval or writing of files from said standard DOS drive can be achieved faster than access, retrieval or writing of files from said non-standard DOE drive; and
    a file handler, connected to said non-standard DOS drive, said standard DOS drive, and to said CPU, wherein said file handler monitors said CPU generated instructions directed through DOS interrupt 21 and caches portions of said desired files or nodes from said non-standard DOS drive in said standard DOS drive in response to instructions directed through DOS interrupt 21 for accessing, retrieving or writing said portions of said desired files or nodes from said non-standard DOS drive.

2. The system of claim 1, wherein said file handler monitors said CPU generated instructions directed through DOS interrupt 21 and retrieves the entire file including said portions from said non-standard DOS drive in response to instructions directed through DOS interrupt 21 for accessing, retrieving or writing said portions of said desired files from said non-standard DOS drive.

3. The system of claim 2, wherein retrieval by said file handler comprises copying the entire file to said standard DOS drive.

4. The system of claim 2, wherein retrieval by said file handler comprises moving the entire file to said standard DOS drive.

5. The system of claim 1, further comprising a plurality of non-standard DOS drives to which said file handler is attached.

6. The system of claim 5, wherein said file handler is preset as to which of said non-standard DOS drives is to be cached.

7. The system of claim 5, wherein said file handler comprises code for selecting which of said non-standard DOS drives is to be cached.

8. The system of claim 5, wherein said file handler is preset as to which of said non-standard DOS drives are not to be cached.

9. The system of claim 5, wherein said file handler comprises Code for selecting which of said non-standard DOS drives are not to be cached.

10. The system of claim 1, wherein said file handler is preset as to which files are to be cached in the standard DOS drive by said file handler.

11. The system of claim 1, wherein said file handler comprises code for selecting which files are to be cached in the standard DOS drive by said file handler.

12. The system of claim 1, wherein said file handler is preset as to which files are not to be cached in the standard DOS drive by said file handler.

13. The system of claim 1, wherein said file handler comprises code for selecting which files are not to be cached in the standard DOS drive by said file handler.

14. The system of claim 1, wherein said file handler monitors said CPU generated instructions directed through DOS interrupt 21 and retrieves a part of a desired file from said nonstandard DOS drive in response to instructions directed through DOS interrupt 21 for accessing, retrieving or writing said desired files from said non-standard DOS drive, said part including information requested by said CPU from said desired file.

15. The system of claim 1, further comprising a plurality of standard DOS drives to which said file handler is attached, each of said standard DOS drives recognized by said CPU as a DOS drive, each of said standard DOS drives targeted for storage of file information from said non-standard DOS drive for access, retrieval or writing of files, wherein the access, retrieval or writing of files from each standard DOS drive can be achieved faster than access, retrieval or writing of files from said non-standard DOS drive.

16. The system of claim 15, wherein said file handler is preset as to which one of said plurality of standard DOS drives is to be used to cache information from the non-standard DOS drive.

17. The system of claim 15, wherein said file handler comprises code for selecting which one of said plurality of standard DOS drives is to be used to cache information from the non-standard DOS drive.

18. The system of claim 15, wherein said file handler is preset as to which non-standard drive information is to be cached in one of the plurality of standard DOS drives by said file handler.

19. The system of claim 15, wherein said file handler comprises code for selecting which non-standard drive information is to be cached in one of the plurality of standard DOS drives by said file handler.

* * * * *

UNITED STATES PATENT AND TRADEMARK OFFICE
CERTIFICATE OF CORRECTION

PATENT NO. : 5,628,014

DATED : May 6, 1997

INVENTOR(S) : Albert B.P. Cecchini and David Kessler

It is certified that error appears in the above-identified patent and that said Letters Patent is hereby corrected as shown below:

Column 2, line 44, change "pear-to-pear" to --peer-to-peer--.

Column 4, line 41, delete "do".

Column 4, line 58, change "is" to --it--.

Column 5, line 17, change "is" to --it--.

Column 5, line 66, Claim 1, change "DOE" to --DOS--.

Signed and Sealed this

Fourteenth Day of October, 1997

Attest:

BRUCE LEHMAN

Attesting Officer

Commissioner of Patents and Trademarks